United States Patent
Nguyen et al.

(10) Patent No.: US 9,562,425 B2
(45) Date of Patent: Feb. 7, 2017

(54) METHODS OF ENHANCING THE CONDUCTIVITY OF PROPPED FRACTURES WITH IN-SITU ACIDIZING

(71) Applicants: Philip D. Nguyen, Houston, TX (US);
Feng Liang, Houston, TX (US);
Thomas D. Welton, Houston, TX (US);
Christopher Parton, Houston, TX (US)

(72) Inventors: Philip D. Nguyen, Houston, TX (US);
Feng Liang, Houston, TX (US);
Thomas D. Welton, Houston, TX (US);
Christopher Parton, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/717,900

(22) Filed: Dec. 18, 2012

(65) Prior Publication Data

US 2014/0166286 A1    Jun. 19, 2014

(51) Int. Cl.
*E21B 21/14*   (2006.01)
*E21B 43/26*   (2006.01)
*C09K 8/72*    (2006.01)

(52) U.S. Cl.
CPC ...... *E21B 43/26* (2013.01); *C09K 8/72* (2013.01)

(58) Field of Classification Search
CPC ............... E21B 21/14; E21B 49/003
USPC ......................................................... 166/300
See application file for complete search history.

(56) References Cited

U.S. PATENT DOCUMENTS

| | | | |
|---|---|---|---|
| 3,727,691 A * | 4/1973 | Muecke et al. | 166/295 |
| 3,938,593 A | 2/1976 | Friedman | |
| 4,320,014 A | 3/1982 | Vivian | |
| 5,905,061 A | 5/1999 | Patel | |
| 5,977,031 A | 11/1999 | Patel | |
| 6,488,091 B1 | 12/2002 | Weaver et al. | |
| 6,725,933 B2 | 4/2004 | Middaugh et al. | |
| 6,828,279 B2 | 12/2004 | Patel et al. | |
| 6,897,334 B2 | 5/2005 | Vennerstrom | |
| 7,303,018 B2 | 12/2007 | Cawiezel et al. | |
| 7,431,089 B1 * | 10/2008 | Couillet | C09K 8/72 166/307 |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 7,704,927 B2 | 4/2010 | Qu et al. | |
| 7,753,123 B2 * | 7/2010 | Fuller | C09K 8/52 166/279 |
| 2005/0269099 A1 | 12/2005 | Stegent et al. | |
| 2006/0084580 A1 | 4/2006 | Santra et al. | |
| 2009/0156433 A1 | 6/2009 | Mebratu et al. | |
| 2010/0212906 A1 * | 8/2010 | Fulton | C09K 8/68 166/308.5 |

FOREIGN PATENT DOCUMENTS

WO     2014099667 A1     6/2014

OTHER PUBLICATIONS

International Search Report and Written Opinion for PCT/US2013/075044 dated Mar. 25, 2014.

* cited by examiner

*Primary Examiner* — Angela M DiTrani
*Assistant Examiner* — Ashish Varma
(74) *Attorney, Agent, or Firm* — McDermott Will & Emery LLP; Craig Roddy

(57) ABSTRACT

Methods of treating subterranean formations comprising providing a wellbore in a subterranean formation having at least one fracture therein; providing a first treatment fluid comprising a base fluid and an acid generating inert agent; providing a second treatment fluid comprising a base fluid, and an acid generating activator; introducing the first treatment fluid into the at least one fracture; and introducing the second treatment fluid into the at least one fracture, wherein the acid generating inert agent in the first treatment fluid reacts with the acid generating activator in the second treatment fluid so as to generate an acid in the at least one fracture and create or enhance at least one microfracture therein.

17 Claims, No Drawings

METHODS OF ENHANCING THE CONDUCTIVITY OF PROPPED FRACTURES WITH IN-SITU ACIDIZING

BACKGROUND

The present invention relates to methods of enhancing the conductivity of propped fractures with in-situ acidizing.

Subterranean wells (e.g., hydrocarbon producing wells, water producing wells, and injection wells) are often stimulated by hydraulic fracturing treatments. In traditional hydraulic fracturing treatments, a viscous treatment fluid is pumped into a portion of a subterranean formation at a rate and pressure such that the subterranean formation breaks down and one or more fractures are formed. While the treatment fluid used to initiate the fracture is generally solids-free, typically, particulate solids, such as graded sand, are suspended in a later portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow.

The degree of success of a fracturing operation depends, at least in part, upon fracture conductivity once the fracturing operation is complete and production is begun. Traditional fracturing operations place a large volume of proppant particulates suspended in a treatment fluid into a fracture to form a "proppant pack" in order to ensure that the fracture does not close completely upon removing the hydraulic pressure. The ability of proppant particulates to maintain a fracture open depends upon the ability of the proppant particulates to withstand fracture closure and, therefore, is typically proportional to the volume of proppant particulates placed within the fracture forming the proppant pack.

In some subterranean treatment operations, traditional fracturing operations may be supplemented with enhanced oil recovery techniques. Such enhanced oil recovery techniques may operate to enhance the conductivity of fractures propped with proppant particulates. One such technique is acidizing a fracture. Acidizing involves injecting an acid (e.g., hydrochloric acid) into a fracture in a subterranean formation in order to etch channels or create microfractures in the face of the fracture in order to enhance the conductivity of the fracture. The acid may create a dendritic-like network of channels or microfractures through which treatment fluids and produced fluids may flow.

Acidizing a fracture in a subterranean formation, particularly in combination with propping the fracture, may operate to supplement or enhance the fractures conductivity and the overall production of the formation. However, acidizing may be limited due to acid spending or leakoff. If the acid is spent or experiences leakoff prior to reaching the desired interval of the subterranean formation (e.g., the fracture), it is insufficiently potent to etch channels or microfractures in the fracture and, thus, does not contribute to or only minimally contributes to enhancing the conductivity of the fracture. Additionally, acidizing may pose a threat to both subterranean formation equipment and operators during well stimulation operations. Subterranean formation operation equipment may be corroded by the acidizing techniques, which involve the placement of strong acids into, for example, steel or iron equipment (e.g., transport, storage, and pumping equipment). Often, corrosion inhibitors are used to combat the effects of acid exposure during acidizing techniques, but they may not be fully effective and may be rather expensive and, thus, cost prohibitive. In addition, handling of acids poses great threat to operators during subterranean formation stimulation operations. Therefore, a method of acidizing a propped fracture at the target interval within a subterranean formation may be of benefit to one of ordinary skill in the art.

SUMMARY OF THE INVENTION

The present invention relates to methods of enhancing the conductivity of propped fractures with in-situ acidizing.

In some embodiments, the present invention provides a method comprising: providing a wellbore in a subterranean formation having at least one fracture therein; providing a first treatment fluid comprising a base fluid and an acid generating inert agent; providing a second treatment fluid comprising a base fluid, and an acid generating activator; introducing the first treatment fluid into the at least one fracture; and introducing the second treatment fluid into the at least one fracture, wherein the acid generating inert agent in the first treatment fluid reacts with the acid generating activator in the second treatment fluid so as to generate an acid in the at least one fracture and create or enhance at least one microfracture therein.

In other embodiments, the present invention provides a method comprising: providing a wellbore in a subterranean formation; providing a first treatment fluid comprising a base fluid and an acid generating inert agent; providing a second treatment fluid comprising a base fluid and an acid generating activator; introducing the first treatment fluid into the wellbore in the subterranean formation at a rate and pressure sufficient to create or enhance at least one fracture therein; and introducing the second treatment fluid into the at least one fracture, wherein the acid generating inert agent in the first treatment fluid reacts with the acid generating activator in the second treatment fluid so as to generate acid in-situ in the at least one fracture and create or enhance at least one microfracture therein.

In still other embodiments, the present invention provides a method comprising: a) providing a wellbore in a subterranean formation having a plurality of treatment intervals; b) providing a first treatment fluid comprising a base fluid and an acid generating inert agent; c) providing a second treatment fluid comprising a base fluid and an acid generating activator; d) introducing the first treatment fluid into the wellbore in the subterranean formation through a hydrojetting tool at a rate and pressure sufficient to create or enhance at least one fracture at a first treatment interval therein; e) introducing the second treatment fluid into the at least one fracture through the annulus between the hydrojetting tool and the subterranean formation, wherein the acid generating inert agent in the first treatment fluid reacts with the acid generating activator in the second treatment fluid so as to generate acid in situ in the at least one fracture and create or enhance at least one microfracture therein; and f) repeating d) through e) at least a second treatment interval.

The features and advantages of the present invention will be readily apparent to those skilled in the art upon a reading of the description of the preferred embodiments that follows.

DETAILED DESCRIPTION

The present invention relates to methods of enhancing the conductivity of propped fractures with in-situ acidizing. In particular, the present invention relates to methods employing a two part acidizing system in order to generate acid at a desired interval within a fracture in a subterranean formation to etch channels or microfractures therein and to enhance the conductivity of the fracture. The present invention uses the reaction of an acid generating inert agent and an acid generating activator at a particular desired interval within a subterranean formation. Such in situ acid generation causes the creation of microfractures within the desired interval of the subterranean formation, typically a fracture. In situ acid generation prevents or minimizes acid spending or leakoff prior to reaching the desired interval, equipment damage from acid exposure, and operator acid handling hazards. As used herein, the term "microfracture" refers to a discontinuity in a portion of the subterranean formation (e.g., a fracture) such that an etch is created in the formation. Microfractures may be channels, perforations, holes, or other ablations within the formation. The microfractures created by the acid generated by the interaction of the acid generating inert agent and acid generating activator of the present invention may increase the conductivity of a fracture in a subterranean formation.

Some embodiments of the present invention place two treatment fluids into a subterranean formation, one fluid that comprises an acid generating inert agent and a second fluid that comprises an acid generating activator. Either fluid may be placed first. That is, in some embodiments, the present invention provides a method of treating a subterranean formation having at least one fracture by providing a wellbore in a subterranean formation having at least one fracture therein providing a first treatment fluid comprising a base fluid and an acid generating inert agent and providing a second treatment fluid comprising a base fluid, and an acid generating activator. The first or second treatment fluid is introduced into the at least one fracture in any order and the acid generating inert agent and the acid generating activator react so as to generate acid in the at least one fracture so as to create or enhance at least one microfracture. In preferred embodiments, the first and second treatment fluids are mixed together just prior to their introduction into the at least one fracture. This method may enhance the quality and quantity of the acid generated in-situ within the at least one fracture by reducing potential displacement of the treatment fluid that is introduced into the at least one fracture subsequent to the introduction of the other treatment fluid. In some embodiments, the treatment fluid that is first introduced into the at least one fracture is pumped at a rate and pressure sufficient to create or enhance the at least one fracture. This may be beneficial if a fracture is not already present within the subterranean formation or the use of a separate treatment fluid composition for creating the fracture is not desirable.

The fractures of the present invention may be naturally present in a subterranean formation or created by any hydraulic fracturing technique known in the art. In those embodiments where the fractures are naturally present in the subterranean formation, the methods of the present invention may be used to enhance the already present fractures by creating or enhancing a network of microfractures (e.g., dendritic-like microfracture structure). In other embodiments, the fractures may be created by hydraulic fracturing, such as by pumping the treatment fluids of the present invention at or above the fracture gradient through perforations extending from the wellbore into the formation. In some cases, the perforations extend through a cement sheath separating the wellbore from the formation. Perforations may be formed using generally circular-shaped charges in order to form the perforations after detonation of the charge. Perforations may also be formed using a hydrojetting tool with a generally circular-shaped hydrojetting nozzle using a jetting fluid comprising a base fluid and/or a cutting particulate.

The hydraulic fracturing techniques for use in the methods of the present invention may also be performed by pumping the treatment fluids of the present invention at or above the fracture gradient through slots in a formation. As used herein, the term "slots" refers to a shaped formation opening in which the shape is a quadrilateral having two directions, where one direction is longer than the other (e.g. a rectangle). In some embodiments, the slots may be at least 3 times as long as wide. Slots may be formed using slot-shaped charges such that the slot is created after detonation of the charge. Slots may be formed using a hydrojetting tool with a slot-shaped hydrojetting nozzle. Slots may also be created using a non-slot-shaped hydrojetting tool by oscillating or reciprocating the nozzle of the hydrojetting tool in a manner that carves out a slot-shaped opening in the formation. Slots may be beneficial to place large volumes of proppant particulates within the fracture. The particular shape of the slots used in the present invention will depend upon multiple factors including, for example, the type of formation, the type of cementitious material used, and the size of the fracture to be propped.

The methods of the present invention may be used in any wellbore in a subterranean formation. As used herein, the term "wellbore" refers to main wellbores (both horizontal and vertical) and lateral wellbores. As used herein, the term "lateral wellbore" refers to a wellbore that extends or radiates from the main wellbore in any direction. Lateral wellbores may be drilled to bypass an unusable portion of a main wellbore or to access particular portions of a subterranean formation without drilling a second main wellbore. Lateral wellbores are often tight formations that may require the use of a hydrojetting tool to treat the lateral wellbore for stimulation operations.

In some embodiments, a hydrojetting tool is preferably used to perform the methods of the present invention. Use of the hydrojetting tool may be beneficial to ensure that the first and second treatment fluids of the present invention do not encounter each other until within the desired treatment interval. This is so because the first or second treatment fluid may be introduced through the hydrojetting tool (i.e., within the tubing attached to the hydrojetting tool) and the other treatment fluid may be introduced directly into the wellbore. Additionally, the use of a hydrojetting tool may allow multiple intervals within a wellbore to be targeted for treatment. For example, in some embodiments of the present invention, a hydrojetting tool is used to introduce a first treatment fluid comprising a base fluid and an acid generating inert agent into a wellbore in a subterranean formation having multiple treatment intervals at a rate and pressure sufficient to create or enhance at least one fracture at a first treatment interval. A second treatment fluid comprising a base fluid and an acid generating activator is introduced into the fracture through the annulus between the hydrojetting tool and the subterranean formation such that the acid generating inert agent and the acid generating activator come into contact and react to form an acid in situ and create microfractures. The steps are then repeated at additional treatment intervals within the subterranean formation.

Suitable base fluids for use in any of the treatment fluids of the present invention requiring a base fluid may include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water; saltwater (e.g., water containing one or more salts dissolved therein); brine (e.g., saturated salt water); seawater; and any combination thereof. Suitable aqueous-miscible fluids may include, but not be limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. Nos. 5,905,061 entitled "Invert Emulsion Fluids Suitable for Drilling" filed on May 23, 1997, 5,977,031 entitled "Ester Based Invert Emulsion Drilling Fluids and Muds Having Negative Alkalinity" filed on Aug. 8, 1998, 6,828,279 entitled "Biodegradable Surfactant for Invert Emulsion Drilling Fluid" filed on Aug. 10, 2001, 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, 7,645,723 entitled "Method of Drilling Using Invert Emulsion Drilling Fluids" filed on Aug. 15, 2007, and 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

In some embodiments, the treatment fluids of the present invention may be gelled, foamed, or both gelled and foamed. This may be particularly beneficial in the treatment fluid containing particulates in order to more uniformly suspend the particulates while pumping the fluid into the wellbore in the subterranean formation. In those embodiments where the treatment fluid is gelled and/or foamed, it may be preferred to break the fluid prior to removing it from the subterranean formation. As used herein, the term "break" refers to causing a fluid to become less viscous in order to more easily remove it from a subterranean formation.

The treatment fluids of the present invention may be gelled by including a gelling agent and, optionally, a crosslinking agent. A variety of gelling agents may be used, including hydratable polymers that contain one or more functional groups such as hydroxyl; carboxyl; sulfate; sulfonate; amino; or amide groups. Suitable gelling agents typically comprise polymers; synthetic polymers; and any combinations thereof. A variety of gelling agents can be used in conjunction with the methods and compositions of the present invention, including, but not limited to, hydratable polymers that contain one or more functional groups such as hydroxyl; cis-hydroxyl; carboxylic acids; derivatives of carboxylic acids; sulfate; sulfonate; phosphate; phosphonate; amino; or amide. In certain embodiments, the gelling agents may be polymers comprising polysaccharides, and derivatives thereof that contain one or more of these monosaccharide units including, but not limited to, galactose; mannose; glucoside; glucose; xylose; arabinose; fructose; glucuronic acid; or pyranosyl sulfate. Examples of suitable polymers include, but are not limited to, guar gum and derivatives thereof (e.g., hydroxypropyl guar and carboxymethylhydroxypropyl guar); carboxymethyl guar; and cellulose derivatives (e.g., carboxylemthyl cellulose and hydroxyethyl cellulose). Additionally, synthetic polymers and copolymers that contain the above-mentioned functional groups may be used. Examples of such synthetic polymers include, but are not limited to, polyacrylate; polymethacrylate; polyacrylamide; polyvinyl alcohol; polyvinylpyrrolidone; and any combinations thereof. In other embodiments, the gelling agent molecule may be depolymerized. As used herein, the term "depolymerized," generally refers to a decrease in the molecular weight of the gelling agent molecule. Depolymerized gelling agent molecules are described in U.S. Pat. No. 6,488,091 issued to Weaver, et al., the entire disclosure of which is incorporated herein by reference. Suitable gelling agents generally are present in the viscosified treatment fluids of the present invention in an amount in the range of from about 0.1% to about 5% by weight of the treatment fluid alone. In preferred embodiments, the gelling agents are present in the treatment fluids of the present invention in an amount in the range of from about 0.01% to about 1% by weight of the treatment fluid alone.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid; disodium octaborate tetrahydrate; sodium diborate; pentaborates; ulexite and colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. Suitable crosslinkers generally are present in the treatment fluids of the present invention in an amount sufficient to provide, in-situ, the desired degree of crosslinking between gelling agent molecules. In certain embodiments of the present invention, the crosslinkers may be present in an amount in the range from about 0.001% to about 10% by weight of the treatment fluid alone. In other embodiments of the present invention, the crosslinkers may be present in the treatment fluids of the present invention in an amount in the range from about 0.01% to about 1% by weight of the treatment fluid alone. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids for use in conjunction with the methods of the present invention may additionally include a gel breaker, such as an enzyme breaker; oxidizing breaker; acid buffer breaker; or temperature-activated gel breaker. The gel breakers cause the treatment fluids to revert to thin fluids that can be produced back to the surface after they have been used to place the proppant particulates or aggregates in subterranean fractures. The gel breaker used is typically present in the treatment fluid in an amount in the range of from about 0.01% to about 10% by weight of the gelling agent.

The treatment fluids of the present invention may be foamed by including a gas and a foaming agent. As used herein, the term "foam" refers to a two-phase composition having a continuous liquid phase and a discontinuous gas phase. Suitable gases for use in conjunction with the present invention may include, but are not limited to, nitrogen; carbon dioxide; air; methane; helium; argon; and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate transport capability, up to about 12 lb of particulate per gallon of treatment fluid.

In some embodiments, the gas may be present such that the treatment fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the treatment fluid may range from any lower limit to any upper limit and encompass any subset therebetween. Most preferably, the treatment fluid may have a foam quality from about 85% to about 95%, or about 90% to about 95%.

Suitable foaming agents for use in conjunction with the present invention may include, but are not limited to, cationic foaming agents; anionic foaming agents; amphoteric foaming agents; nonionic foaming agents; or any combination thereof. Nonlimiting examples of suitable foaming agents may include, but are not limited to, surfactants like betaines; sulfated alkoxylates; sulfonated alkoxylates; alkyl quarternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included in treatment fluids of the present invention at concentrations ranging typically from about 0.05% to about 2% by weight of the liquid component (e.g., from about 0.5 to about 20 gallons per 1000 gallons of liquid).

Any of the treatment fluids of the present invention may additionally comprise any additive suitable for use in subterranean operations provided that it does not interfere with the acid generation mechanism of the present invention. Suitable additives include, but are not limited to, a weighting agent; a fluid loss control agent; an emulsifier; a dispersion aid; a corrosion inhibitor; a lost circulation material; a pH control additive; a biocide; a stabilizing agent; a chelating agent; a scale inhibitor; a mutual solvent; an oxidizer; a reducer; a friction reducer; a clay stabilizing agent; a breaker; and any combinations thereof.

In some embodiments, proppant particulates may be included in the treatment fluids of the present invention so as to create a proppant pack within the at least one fracture of the present invention. The proppant pack may operate synergistically with the in-situ acid generated so as to enhance the conductivity of the fracture. The proppant particulates that may be used in the treatment fluids of the present invention may be any material suitable for use in a stimulation operation. Proppant particulates suitable for use in the methods of the present invention may be of any size and shape combination known in the art as suitable for use in a subterranean operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is that there is no need for the proppant particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped; rectangular-shaped; rod-shaped; ellipse-shaped; cone-shaped; pyramid-shaped; or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length.

Suitable material compositions for the proppant particulates of the present invention include, but are not limited to, sand; bauxite; ceramic materials; thermoplastic materials; glass materials; polymer materials (e.g., ethylene vinyl acetate or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood, composite particulates; and combinations thereof. Suitable composite particulates may comprise a binder and a filler material wherein suitable filler materials include silica; alumina; fumed carbon; carbon black; graphite; mica; titanium dioxide; barite; meta-silicate; calcium silicate; kaolin; talc; zirconia; boron; fly ash; hollow glass microspheres; solid glass; and combinations thereof. Suitable proppant particles for use in conjunction with the present invention may be any known shape of material, including substantially spherical materials; fibrous materials; polygonal materials (such as cubic materials); and combinations thereof. Proppant particulates may be present in the treatment fluids of the present invention in an amount from about 0.1 lbs/Gal to about 10 lbs/Gal by volume. In preferred embodiments, the proppant particulates may be present in the treatment fluids of the present invention in an amount from about 2 lbs/Gal to about 6 lbs/Gal by volume.

In some embodiments, a consolidating agent may be included to aid in binding individual proppant particulates together to form a proppant pack. The consolidating agent may be coated onto the proppant particulates either prior to introducing them into the treatment fluid or "on-the-fly" at the wellbore site. As used herein, the term "on-the-fly" refers to performing an operation during a subterranean treatment that does not require stopping normal operations. Suitable consolidating agents may include any consolidating agents suitable for use in stimulation operations. Nonlimiting examples of suitable consolidating agents include, but are not limited to, non-aqueous tackifying agents; aqueous tackifying agents; emulsified tackifying agents; silyl-modified polyamide compounds; resins; crosslinkable aqueous polymer compositions; polymerizable organic monomer compositions; consolidating agent emulsions; zeta-potential modifying aggregating compositions; silicon-based resins; binders; any derivatives thereof; and any combinations thereof. The consolidating agent may be useful in the methods of the present invention in an amount from about 0.1% to about 10% by weight of the proppant particulates. In preferred embodiments, the consolidating agent may be useful in the methods of the present invention in an amount from about 1% to about 5% by weight of the proppant particulate. It is within the ability of one skilled in the art, with the benefit of this disclosure, to determine the need and type and amount of consolidating agent to include in the methods of the present invention to achieve the desired results.

In some embodiments of the present invention, degradable particulates may be included in the treatments fluids having proppant particulates such that they intermix with proppant particulates and form a portion of the proppant pack. Upon a triggering event, the degradable particulates may be degraded, leaving behind spaces in the proppant pack that may enhance the conductivity of the propped fracture. It may be desirable that the degradable particulates have similar particle size, shape, and specific gravity as those of the proppant particulates. Suitable degradable particulates may include, but are not limited to, oil-degradable polymers; degradable polymers; degradable salts; blends thereof; and any combinations thereof. In some embodiments of the present invention, degradable particulates are included in the treatment fluids of the present invention from about 1% to about 20% by weight of the proppant particulates. In preferred embodiments, degradable particulates are included in the treatment fluids of the present invention from about 15% to about 5% by weight of the proppant particulates. One of ordinary skill in the art with the benefit of this disclosure will recognize whether to include and the optimum concentration of degradable material to include in the thinning resistant fluids of the present invention to achieve the desired results.

In some embodiments, the first treatment fluid of the present invention may further comprise a cutting particulate to aid in creating or enhancing fractures within a subterranean formation. The cutting particulate suitable for use in the present invention may be any proppant particulate suitable for use in a subterranean operation that is capable of withstanding the formation pressure so as to create a perforation or slot therein. Suitable cutting particulates include those proppant particulates and degradable particulates described herein. The cutting particulates may be present in the first treatment fluids of the present invention in an amount from about 0.1 lb/gal to about 20 lb/gal. In preferred embodiments, the cutting particulates may be present in the first treatment fluids of the present invention in an amount from about 0.1 lb/gal to about 15 lb/gal. In more preferred embodiments, the cutting particulates may be present in the first treatment fluids of the present invention in an amount from about 0.25 lb/gal to about 12 lb/gal.

Any acid that is capable of creating microfractures within a fracture in a subterranean formation may be created by the reaction of the acid generating inert agent and the acid generating agent of the present invention. Some acids may be preferred in certain subterranean formation types because they are better able to create microfractures. By way of nonlimiting example, hydrochloric acid may be preferred for treating carbonate formations, whereas a mixture of hydrochloric acid and hydrofluoric acid may be preferred for treatment of sandstone formations. It is within the ability of one of ordinary skill in the art, with the benefit of this disclosure, to determine the type or combination of acid(s) to use for a particular treatment application.

In some embodiments of the present invention, the acid generated by the reaction of the acid generating inert agent and the acid generating activator is a hydrofluoric acid; a hydrochloric acid; an acid halide; or any combinations thereof. The acid generating inert agent and the acid generating activator may be any two chemicals that are substantially nonreactive in the treatment fluids of the present invention but when placed in contact with one another are capable of reacting to form an acid.

In those embodiments where the acid generated by the methods of the present invention is a hydrofluoric acid, the acid generating inert agent may be, but is not limited to, a sulfonate ester. Suitable sulfonate esters for use as an acid generating inert agent of the present invention may include, but are not limited to a methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate; an any combinations thereof. The acid generating activator for use in generating hydrofluoric acid in the methods of the present invention may be, but is not limited to, a fluoride salt. As used herein, the term "fluoride salt" also encompasses bifluoride salts. Suitable fluoride salts for use as an acid generating activator of the present invention may include, but are not limited to, an ammonium fluoride; an ammonium bifluoride; a potassium fluoride; a potassium bifluoride; a sodium fluoride; a sodium bifluoride; a lithium fluoride; a lithium bifluoride; a rubidium fluoride; a rubidium bifluoride; a cesium fluoride; a cesium bifluoride; and any combinations thereof.

In those embodiments where the acid generated by the methods of the present invention is a hydrochloric acid, the acid generating inert agent may be, but is not limited to, a sulfonate ester. Suitable sulfonate esters for use as an acid generating inert agent of the present invention may include, but are not limited to a methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate; an any combinations thereof. The acid generating activator for use in generating hydrochloric acid in the methods of the present invention may be, but is not limited to, a chloride salt. Suitable chloride salts for use as an acid generating activator of the present invention may include, but are not limited to, an ammonium chloride; a potassium chloride; a sodium chloride; a lithium chloride; a cesium chloride; and any combinations thereof. In those embodiments where the acid generated by the methods of the present invention is an acid halide, the acid generating inert agent may be, but is not limited to, an acyl halide and the acid generating activator may be, but is not limited to, water.

The acid generating inert agent of the present invention may be present in the treatment fluids of the present invention in an amount from about 0.1% to about 50% by volume. In preferred embodiments, the acid generating inert agent of the present invention may be present in the treatment fluids of the present invention in an amount from about 0.5% to about 30% by volume. The acid generating activator of the present invention may be present in the treatment fluids of the present invention in an amount from about 0.1% to about 50% by volume. In preferred embodiments, the acid generating activator of the present invention may be present in the treatment fluids of the present invention in an amount from about 0.5% to about 30% by volume. In those embodiments where the acid generated by the methods of the present invention is hydrofluoric acid, the acid generating inert agent and the acid generating activator may be preferably present in an amount from about 0.5% to about 5% by volume of the treatment fluid. In those embodiments where the acid generated by the methods of the present invention is not a hydrofluoric acid, the acid generating inert agent and the acid generating activator may preferably be present in an amount from about 5% to about 30% by volume of the treatment fluid. When the treatment fluids are foamed, the percent by volume presence of the acid generating inert agent and the acid generating activator is determined excluding the presence of gas.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a wellbore in a subterranean formation having at least one fracture therein;
providing a first treatment fluid comprising a base fluid and an acid generating inert agent in an amount of from about 0.1% to about 50% by volume of the first treatment fluid,
wherein the acid generating inert agent is selected from the group consisting of a sulfonate ester selected from the group consisting of a methyl p-toluenesulfonate, an ethyl p-toluenesulfonate, a methyl o-toluenesulfonate, an ethyl o-toluenesulfonate, a methyl m-toluenesulfonate, an ethyl m-toluenesulfonate, a methyl methanesulfonate, an ethyl methanesulfonate; and any combinations thereof;
providing a second treatment fluid comprising a base fluid, and an acid generating activator in an amount of from about 0.1% to about 50% by volume of the second treatment fluid,
wherein the first treatment fluid and the second treatment fluid are two separate fluids, and
wherein the first treatment fluid is introduced into the at least one fracture prior to introducing the second treatment fluid, or wherein the second treatment fluid is introduced into the at least one fracture prior to introducing the first treatment fluid;
introducing the first treatment fluid into the at least one fracture; and
introducing the second treatment fluid into the at least one fracture,
wherein the acid generating inert agent in the first treatment fluid reacts with the acid generating activator in the second treatment fluid so as to generate an acid in the at least one fracture and create or enhance at least one microfracture therein.

2. The method of claim 1, wherein the subterranean formation comprises naturally present fractures.

3. The method of claim 1, wherein the acid generated in the at least one fracture is a hydrofluoric acid solution, a hydrochloric acid solution, an acid halide solution, or any combination thereof.

4. The method of claim 3, wherein the acid generating inert agent used to generate the hydrofluoric acid solution is the sulfonate ester and the acid generating activator used to generate the hydrofluoric acid solution is a fluoride salt.

5. The method of claim 3, wherein the acid generating inert agent used to generate the hydrochloric acid solution is the sulfonate ester and the acid generating activator used to generate the hydrochloric acid solution is a chloride salt.

6. The method of claim 3, wherein the acid generating inert agent used to generate the acid halide solution is the acyl halide and the acid generating activator used to generate the acid halide solution is water.

7. A method comprising:
providing a wellbore in a subterranean formation;
providing a first treatment fluid comprising a base fluid and an acid generating inert agent in an amount of from about 0.1% to about 50% by volume of the first treatment fluid,
wherein the acid generating inert agent is selected from the group consisting of a sulfonate ester selected from the group consisting of a methyl p-toluenesulfonate, an ethyl p-toluenesulfonate, a methyl o-toluenesulfonate, an ethyl o-toluenesulfonate, a methyl m-toluenesulfonate, an ethyl m-toluenesulfonate, a methyl methanesulfonate, an ethyl methanesulfonate; and any combinations thereof;

providing a second treatment fluid comprising a base fluid and an acid generating activator in an amount of from about 0.1% to about 50% by volume of the second treatment fluid, wherein the first treatment fluid and the second treatment fluid are two separate fluids, and wherein the first treatment fluid is introduced into the at least one fracture prior to introducing the second treatment fluid, or wherein the second treatment fluid is introduced into the at least one fracture prior to introducing the first treatment fluid;

introducing the first treatment fluid into the wellbore in the subterranean formation at a rate and pressure sufficient to create or enhance at least one fracture therein; and introducing the second treatment fluid into the at least one fracture, wherein the acid generating inert agent in the first treatment fluid reacts with the acid generating activator in the second treatment fluid so as to generate acid in-situ in the at least one fracture and create or enhance at least one microfracture therein.

8. The method of claim 7, wherein the second treatment fluid further comprises particulates selected from the group consisting of proppant particulates; degradable particulates; and combinations thereof.

9. The method of claim 7, wherein the acid generated in the at least one fracture is a hydrofluoric acid solution, a hydrochloric acid solution, an acid halide solution, or any combination thereof.

10. The method of claim 9, wherein the acid generating inert agent used to generate the hydrofluoric acid solution is the sulfonate ester and the acid generating activator used to generate the hydrofluoric acid solution is a fluoride salt, wherein the fluoride salt is selected from the group consisting of an ammonium fluoride; an ammonium bifluoride; a potassium fluoride; a potassium bifluoride; a sodium fluoride; a sodium bifluoride; a lithium fluoride; a lithium bifluoride; a rubidium fluoride; a rubidium bifluoride; a cesium fluoride; a cesium bifluoride; and any combinations thereof.

11. The method of claim 9, wherein the acid generating inert agent used to generate the hydrochloric acid solution is the sulfonate ester and the acid generating activator used to generate the hydrochloric acid solution is a chloride salt, wherein the chloride salt is selected from the group consisting of an ammonium chloride; a potassium chloride; a sodium chloride; a lithium chloride; a cesium chloride; and any combinations thereof.

12. The method of claim 9, wherein the acid generating inert agent used to generate the acid halide solution is the acyl halide and the acid generating activator used to generate the acid halide solution is water.

13. A method consisting of:
a) providing a wellbore in a subterranean formation having a plurality of treatment intervals;
b) providing a first treatment fluid comprising a base fluid and an acid generating inert agent in an amount of from about 0.1% to about 50% by volume of the first treatment fluid, wherein the acid generating inert agent is selected from the group consisting of a sulfonate ester selected from the group consisting of a methyl p-toluenesulfonate, an ethyl p-toluenesulfonate, a methyl o-toluenesulfonate, an ethyl o-toluenesulfonate, a methyl m-toluenesulfonate, an ethyl m-toluenesulfonate, a methyl methanesulfonate, an ethyl methanesulfonate; and any combinations thereof;

c) providing a second treatment fluid comprising a base fluid and an acid generating activator in an amount of from about 0.1% to about 50% by volume of the second treatment fluid, wherein the first treatment fluid and the second treatment fluid are two separate fluids, and wherein the first treatment fluid is introduced into the at least one fracture prior to introducing the second treatment fluid, or wherein the second treatment fluid is introduced into the at least one fracture prior to introducing the first treatment fluid;

d) introducing the first treatment fluid into the wellbore in the subterranean formation through a hydrojetting tool at a rate and pressure sufficient to create or enhance at least one fracture at a first treatment interval therein;

e) introducing the second treatment fluid into the at least one fracture through the annulus between the hydrojetting tool and the subterranean formation, wherein the acid generating inert agent in the first treatment fluid reacts with the acid generating activator in the second treatment fluid so as to generate acid in-situ in the at least one fracture and create or enhance at least one microfracture therein; and f) repeating d) through e) at at least a second treatment interval.

14. The method of claim 13, wherein the acid generated in the at least one fracture is a hydrofluoric acid solution, a hydrochloric acid solution, an acid halide solution, or any combination thereof.

15. The method of claim 14, wherein the acid generating inert agent used to generate the hydrofluoric acid solution is the sulfonate ester and the acid generating activator used to generate the hydrofluoric acid solution is a fluoride salt, wherein the fluoride salt is selected from the group consisting of an ammonium fluoride; an ammonium bifluoride; a potassium fluoride; a potassium bifluoride; a sodium fluoride; a sodium bifluoride; a lithium fluoride; a lithium bifluoride; a rubidium fluoride; a rubidium bifluoride; a cesium fluoride; a cesium bifluoride; and any combinations thereof.

16. The method of claim 14, wherein the acid generating inert agent used to generate the hydrochloric acid solution is the sulfonate ester and the acid generating activator used to generate the hydrochloric acid solution is a chloride salt, wherein the chloride salt is selected from the group consisting of an ammonium chloride; a potassium chloride; a sodium chloride; a lithium chloride; a cesium chloride; and any combinations thereof.

17. The method of claim 14, wherein the acid generating inert agent used to generate the acid halide solution is the acyl halide and the acid generating activator used to generate the acid halide solution is water.

* * * * *